US012766056B2

(12) United States Patent
Ciolfe et al.

(10) Patent No.: US 12,766,056 B2
(45) Date of Patent: Oct. 20, 2026

(54) SUSPENSION SYSTEM FOR POWER WHEELCHAIR STANDER

(71) Applicant: Motion Concepts L.P., Concord (CA)

(72) Inventors: David Ciolfe, Aurora (CA); David Headrick, North York (CA); Son Ma, Vaughan (CA)

(73) Assignee: MOTION CONCEPTS L.P., Concord (CA)

( * ) Notice: Subject to any disclaimer, the term of this patent is extended or adjusted under 35 U.S.C. 154(b) by 942 days.

(21) Appl. No.: 17/872,151

(22) Filed: Jul. 25, 2022

(65) Prior Publication Data

US 2022/0409458 A1 Dec. 29, 2022

Related U.S. Application Data

(63) Continuation of application No. 16/822,529, filed on Mar. 18, 2020, now Pat. No. 11,426,313.

(60) Provisional application No. 62/819,962, filed on Mar. 18, 2019.

(51) Int. Cl.

*A61G 5/14* (2006.01)
*A61G 5/06* (2006.01)
*A61G 5/10* (2006.01)

(52) U.S. Cl.

CPC ................. *A61G 5/14* (2013.01); *A61G 5/06* (2013.01); *A61G 5/1078* (2016.11)

(58) Field of Classification Search

CPC ...... A61G 5/14; A61G 5/1078; A61G 5/1059; A61G 5/107
USPC .................................. 280/283, 304.1, 226.1
See application file for complete search history.

(56) References Cited

U.S. PATENT DOCUMENTS

| | | | | |
|---|---|---|---|---|
| 2,053,852 | A | 9/1936 | North | |
| 5,772,226 | A | 6/1998 | Bobichon | |
| 6,047,979 | A | 4/2000 | Kraft | |
| 6,129,165 | A | 10/2000 | Schaffner | |
| 6,234,576 | B1 * | 5/2001 | Fleigle | A61G 5/1054 297/423.37 |
| 6,460,641 | B1 | 10/2002 | Kral | |
| 6,923,278 | B2 | 8/2005 | Mulhern | |
| 7,059,621 | B2 | 6/2006 | Di Blasi | |
| 7,150,463 | B1 * | 12/2006 | Liao | A61G 5/063 280/124.128 |

(Continued)

FOREIGN PATENT DOCUMENTS

| | | |
|---|---|---|
| CN | 104095736 A | 10/2014 |
| EP | 0945114 A1 | 9/1999 |

(Continued)

OTHER PUBLICATIONS

European Search Report from European Application No. 20774649.6 dated Nov. 18, 2022.

(Continued)

*Primary Examiner* — John Olszewski
*Assistant Examiner* — Nathaniel William Watkins
(74) *Attorney, Agent, or Firm* — Leason Ellis LLP

(57) ABSTRACT

A wheelchair including a frame and a suspension system. The suspension system may have at least one front caster arm pivotally connected to the frame, a front caster connected to the front caster arm, a first link, and a second link. The first link is pivotally connected to the frame, and the second link is slidably connected to the front caster arm and pivotally connected to the first link.

15 Claims, 11 Drawing Sheets

(56) References Cited

U.S. PATENT DOCUMENTS

| | | | | |
|---|---|---|---|---|
| 7,264,272 | B2 * | 9/2007 | Mulhern | A61G 5/043 280/755 |
| 7,370,876 | B2 | 5/2008 | Hsu | |
| 7,506,709 | B2 * | 3/2009 | Kiwak | A61G 5/1078 280/124.1 |
| 7,896,394 | B2 | 3/2011 | Jackson | |
| 7,909,354 | B2 | 3/2011 | Easton | |
| 8,113,531 | B2 * | 2/2012 | Zhou | A61G 5/1078 180/209 |
| 9,308,143 | B2 | 4/2016 | Bekoscke | |
| 9,808,383 | B2 * | 11/2017 | Mulhern | A61G 5/06 |
| 9,988,065 | B2 | 6/2018 | Ruggiero | |
| 10,226,392 | B2 | 3/2019 | Chiang | |
| 2005/0077715 | A1 | 4/2005 | Mulhern | |
| 2006/0097475 | A1 | 5/2006 | Kiwak | |
| 2007/0045991 | A1 | 3/2007 | Perk | |
| 2007/0063480 | A1 * | 3/2007 | Porcheron | A61G 5/127 280/304.1 |
| 2008/0106060 | A1 * | 5/2008 | Knopf | A61G 5/06 280/250.1 |
| 2009/0218784 | A1 | 9/2009 | Porcheron | |
| 2010/0213683 | A1 | 8/2010 | Vreeswijk | |
| 2011/0012316 | A1 | 1/2011 | Cheng | |
| 2012/0012416 | A1 | 1/2012 | Mirzaie | |
| 2012/0313341 | A1 | 12/2012 | Mills | |
| 2017/0367912 | A1 | 12/2017 | Chiang | |
| 2020/0297561 | A1 | 9/2020 | Ciolfe | |

FOREIGN PATENT DOCUMENTS

| | | | |
|---|---|---|---|
| EP | 1523971 | A2 | 4/2005 |
| EP | 2832336 | A1 | 2/2015 |
| KR | 20120043826 | A | 5/2012 |

OTHER PUBLICATIONS

International Search Report from PCT/IB2020/000132, dated Jul. 2, 2020 (10 Pages).

Office Action from U.S. Appl. No. 16/822,529 dated Feb. 17, 2022.

Amendment U.S. Appl. No. 16/822,529 dated Apr. 6, 2022.

Notice of Allowance from U.S. Appl. No. 16/822,529 dated Apr. 21, 2022.

* cited by examiner

SUSPENSION SYSTEM FOR POWER WHEELCHAIR STANDER

RELATED APPLICATIONS

This application fully incorporates by reference and claims priority to U.S. Provisional Patent Application Ser. No. 62/819,962, filed Mar. 18, 2019, titled Suspension System for Power Wheelchair Stander and is a continuation U.S. patent application Ser. No. 16/822,529, filed on Mar. 18, 2020, titled Suspension System for Power Wheelchair Stander System.

BACKGROUND

Wheelchairs are an important means of transportation for a significant portion of society. Whether manual or powered, these vehicles provide an important degree of independence for those they assist. However, this degree of independence can be limited if the wheelchair is required to traverse obstacles such as, for example, door thresholds that are commonly present in a doorway between adjacent rooms, or curbs that are commonly present at sidewalks, driveways, and other paved surface interfaces. This degree of independence can also be limited if the vehicle is required to ascend inclines or descend declines, which may cause the wheelchair to tip forward or backwards. Further yet, various user positioning systems (including seating to standing systems) provide many benefits but also challenge wheelchair suspension systems by moving the overall center of gravity of the wheelchair.

SUMMARY

An exemplary embodiment of a wheelchair includes a frame and a suspension system. The suspension system has at least one front caster arm pivotally connected to the frame, a front caster connected to the front caster arm, a first link, and a second link. The first link is pivotally connected to the frame, and the second link is slidably connected to the front caster arm and pivotally connected to the first link.

Another exemplary embodiment of a wheelchair includes a frame and a suspension system. The suspension system has at least one front caster arm pivotally connected to the frame, a front caster connected to the front caster arm, and a linkage. The linkage is pivotally connected to the frame and slidably connected to the front caster arm, and the linkage has a pin and slot arrangement for selectively limiting the movement of the front caster arm relative to the frame.

Another exemplary embodiment of a wheelchair includes a frame and a suspension system. The suspension system has at least one front caster arm pivotally connected to the frame, a front caster connected to the front caster arm, and a first linking means for pivotally connecting to the frame, and a second linking means for slidably connecting to the front caster arm and pivotally connecting to the first linking means.

BRIEF DESCRIPTION OF THE DRAWINGS

In the accompanying drawings, which are incorporated in and constitute a part of the specification, embodiments of the invention are illustrated, which together with a general description and the detailed description given below, serve to example the principles of the inventions.

DETAILED DESCRIPTION

Figure 1:
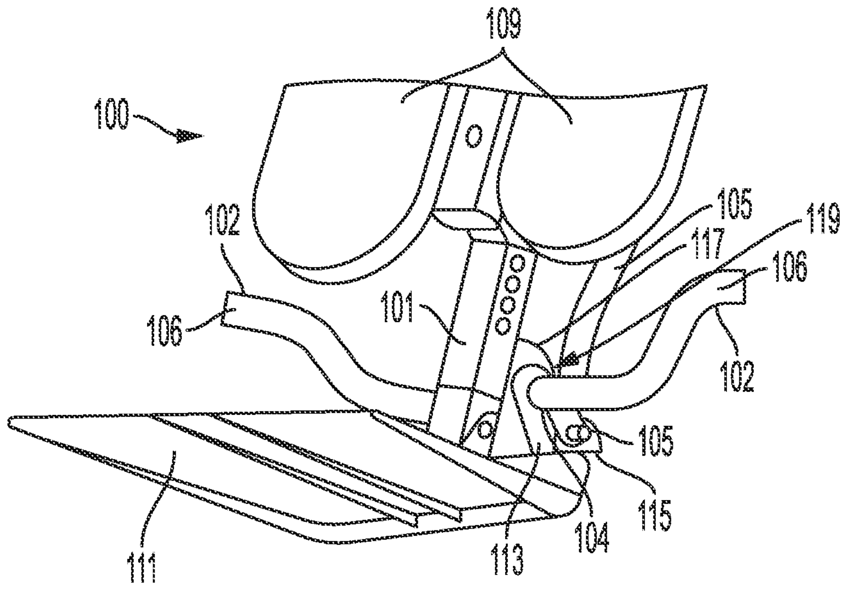
FIG. 1 is a partial perspective view of an exemplary embodiment of a user positioning system for a power wheelchair.

The Detailed Description describes exemplary embodiments of the invention and is not intended to limit the scope of the claims in any way. Indeed, the invention is broader than and unlimited by the exemplary embodiments, and the terms used in the claims have their full ordinary meaning. Features and components of one exemplary embodiment may be incorporated into the other exemplary embodiments. Inventions within the scope of this application may include additional features, or may have less features, than those shown in the exemplary embodiments.

As described herein, when one or more components are described or shown as being connected, joined, affixed, coupled, attached, or otherwise interconnected, such interconnection may be direct as between the components or may be indirect such as through the use of one or more intermediary components. Also, as described herein, reference to a member, component, or portion shall not be limited to a single structural member, component, element, or portion but can include an assembly of components, members, elements, or portions.

Embodiments of the present inventions provide a suspension system for a power wheelchair equipped with, for example, a standing system or user elevating system. Such a system allows the user to go from a seating position to standing or elevated position while being in the wheelchair. Embodiments of the present invention provide a suspension system that allows, while the user is in the seated position, a full range of obstacle (and incline and decline) traversing capability. The embodiments also provide a suspension system that, while the user is in the standing or elevated position, is more limited/restricted in obstacle traversing capability, but not entirely restricted. That is, the suspension systems described herein may include one or more linkages that connect the wheelchair frame to one or more caster wheels such that the suspension system provides a limited range of movement between the wheelchair frame and the caster wheels when a user is in the standing or elevated position, which allows the user to traverse various obstacles when in the standing or elevated position.

The benefits of limiting the suspension system include limiting or eliminating wheelchair tipping behavior that may be caused by moving the user from a seated to a standing position, while allowing for partial movement of the suspension system (i.e., not fully-locking the suspension system) such that the wheelchair can better traverse obstacles (e.g., a doorway threshold, a curb, an incline or decline, etc.). Generally, moving a user to a standing or elevated position moves the occupied wheelchair center of gravity to a more forward or more higher position compared with when the user is in the seated position. Moving the center of gravity forward and/or higher can cause the wheelchair frame to exhibit a tipping behavior under certain circumstances, which can be unsettling for the user. The embodiments of the present invention, however, are configured to allow for partial movement of the suspension system when the user is in the standing position to allow the wheelchair to better traverse obstacles, but are also configured to prevent the wheelchair from tipping over as a result of the center of gravity moving to a more forward and/or higher position.

FIG. 1 illustrates a partial perspective view of one embodiment of a power wheelchair user positioning system 100 that is capable of moving between a seating position and a standing or elevated position. One example of such a user positioning system is manufactured by Motion Concepts of Ontario, Canada under the model name MPS (Multi Position Stander). Such user positioning systems allow users to move to a standing and/or elevated position to get closer to store shelves and kitchen cabinets or help them see above the crowd. Standing and/or elevating also enables users to engage people eye-to-eye to enhance communication, increasing social interaction and self-esteem.

In addition to various other components, in certain embodiments, the user positioning system 100 may include a lower frame member 101, an upper frame member 703 (FIGS. 7-11) pivotally connected to the lower frame member, and a link 105. The lower frame member 101, the upper frame member 703, and the link 105 may be connected to a power control system that is used to move the user positioning system 100 between the seating position and the standing and/or elevated position. The link 105 may be connected to one or both of the lower frame member 101 and the upper frame member 703, and/or any other member connected to the user positioning system 100. The bar 102 is configured to move and engage the suspension system 200 (FIGS. 2-11) when user positioning system 100 moves from the seating position to, for example, the standing position. The user positioning system 100 may include a lower user support member 109 connected to the lower frame member 101, and an upper user support member (e.g., a seat) connected to the upper frame member 703. The user positioning system 100 may also include a weight bearing footrest 111 connected to the lower frame member 101 for supporting the user's feet when in the seating or standing position.

The link 105 may be pivotally connected to the lower frame member 101, and the bar 102 may be connected to the link 105 such that movement of the link 105 (as the user positioning system 100 moves from the seating position to, for example, the standing position) causes the bar 102 to move and engage the suspension system 200 (FIGS. 2-11). For example, in the illustrated embodiment, the link 105 may be pivotally connected to a bracket 113 at connection point 115, which is pivotally connected to a rearward extended member 117 of the lower frame member 101 at a connection point 119. A first portion 104 of the bar 102 may be connected to the bracket 113 such that pivoting of the bracket 113 about the connection point 119 causes the bar 102 to move and the second portion 106 of the bar 102 to engage the suspension system 200. The bar 102 acts as a force transferring component by using at least a portion of the user's weight to apply a force or pressure to the suspension system 200 to limit the suspension system 200 when the user positioning system 100 is in the standing position. While bar 102 is shown having the particular geometry and configuration of FIG. 1, other geometry and shapes may be used including a straight bar or a bar having multiple bends. The particular shape or geometry of bar 102 is not critical so long as it can engage with the suspension system of the power wheelchair to limit movement of the suspension system when the user positioning system is in the standing position. The bar 102 may be made of a rigid material, such as, for example, metal. In other embodiments, the bar 102 and its function can be disassociated with the user positioning system. For example, bar 102 may be actuator-based where an actuator can move bar 102 into and out of engagement with the suspension system either in association with or independent from any user positioning system. While the bar 102 is described as engaging the suspension system when the user positioning system 100 moves from the seating position to the standing position, in some embodiments, the bar 102 can be configured to engage the suspension system when the user positioning system 100 is in other positions, such as, for example, when the user positioning system 100 moves from the seating position to the elevated position.

Figure 2:
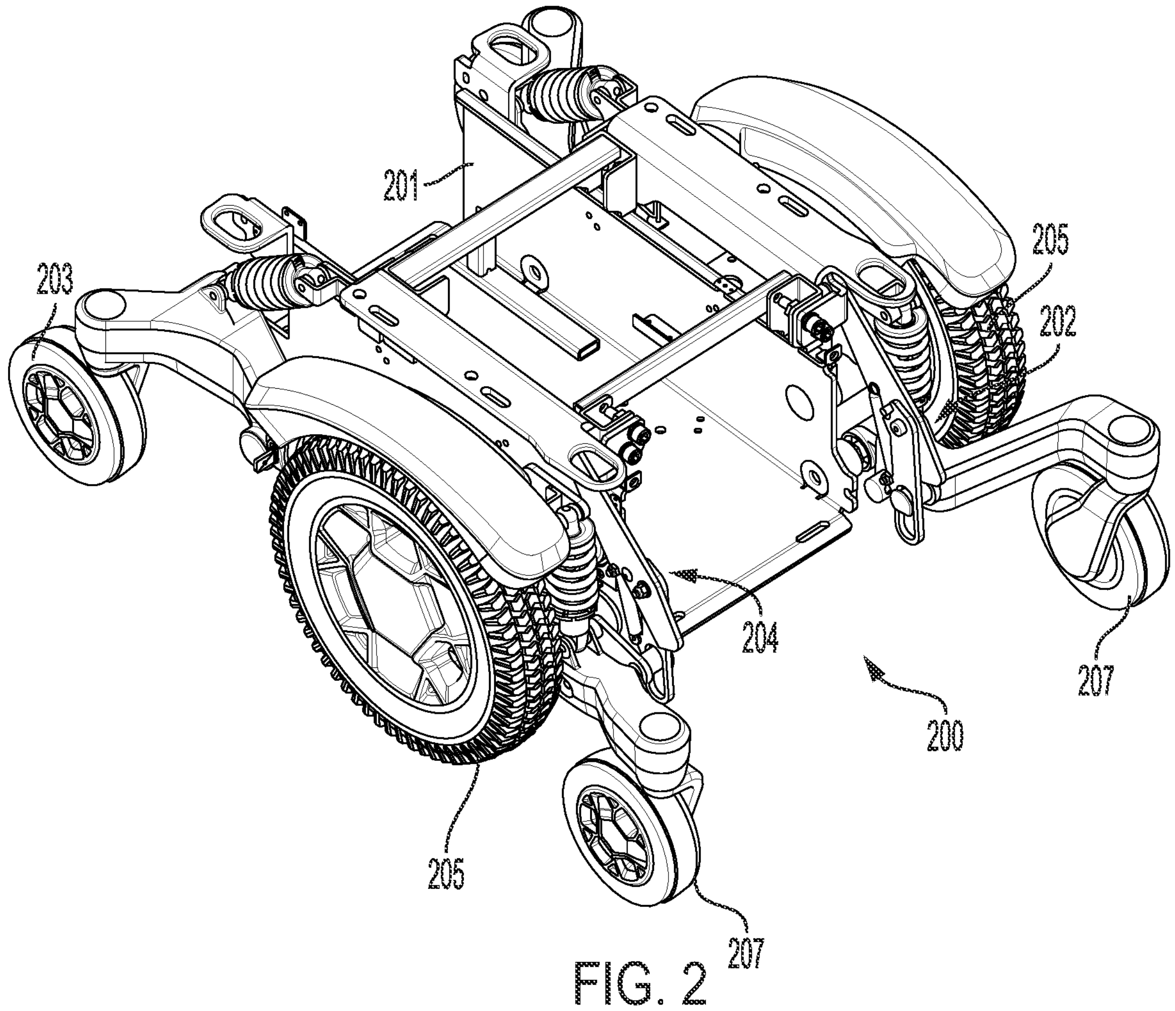
FIG. 2 is a perspective view of an exemplary embodiment of a power wheelchair base and suspension system of the present invention.
Figure 3:
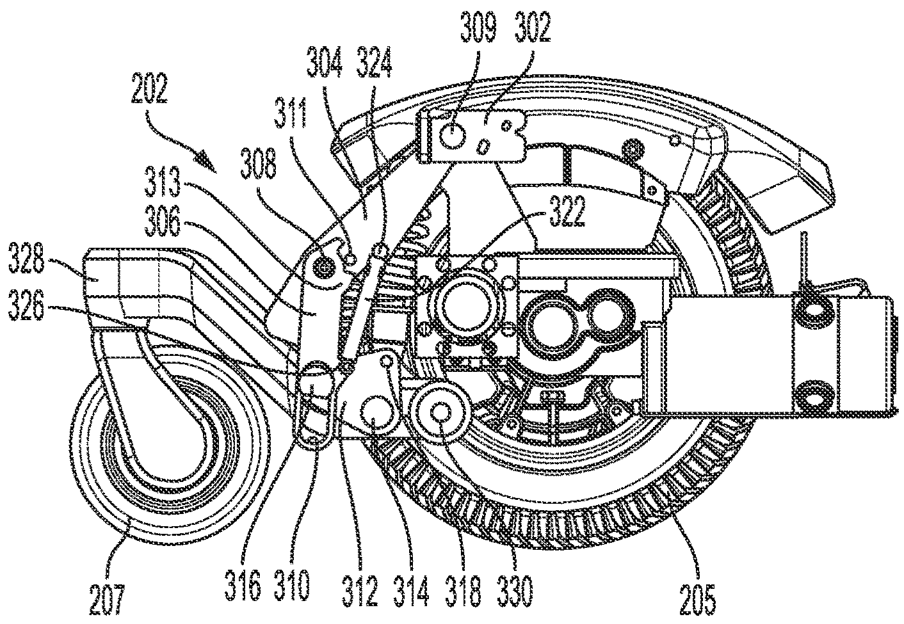
FIG. 3 is a partial side view of the power wheelchair base and suspension system of FIG. 2.
Figure 4:
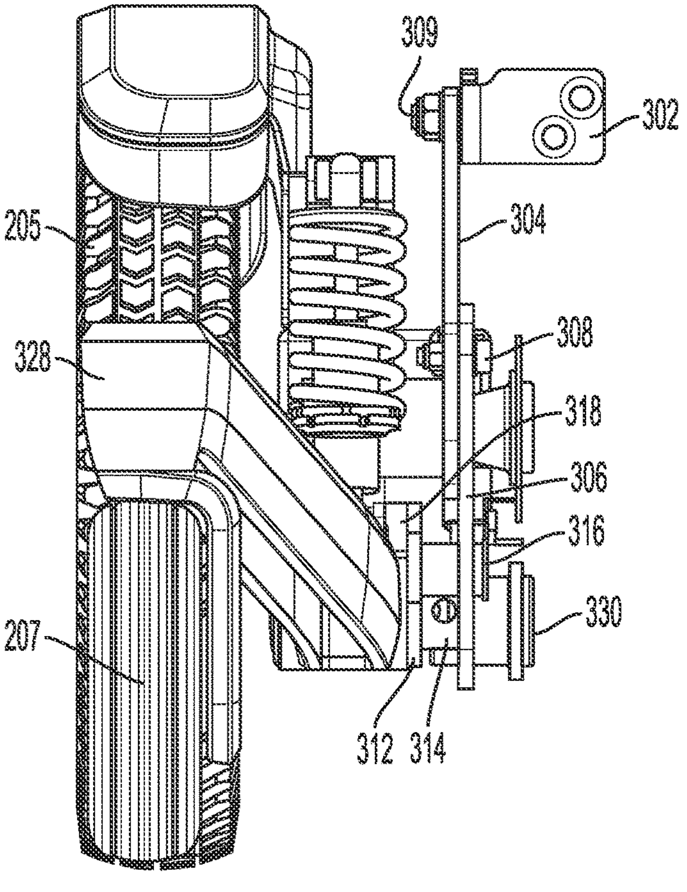
FIG. 4 is a partial front elevational view of the components of FIG. 3.
Figure 5:
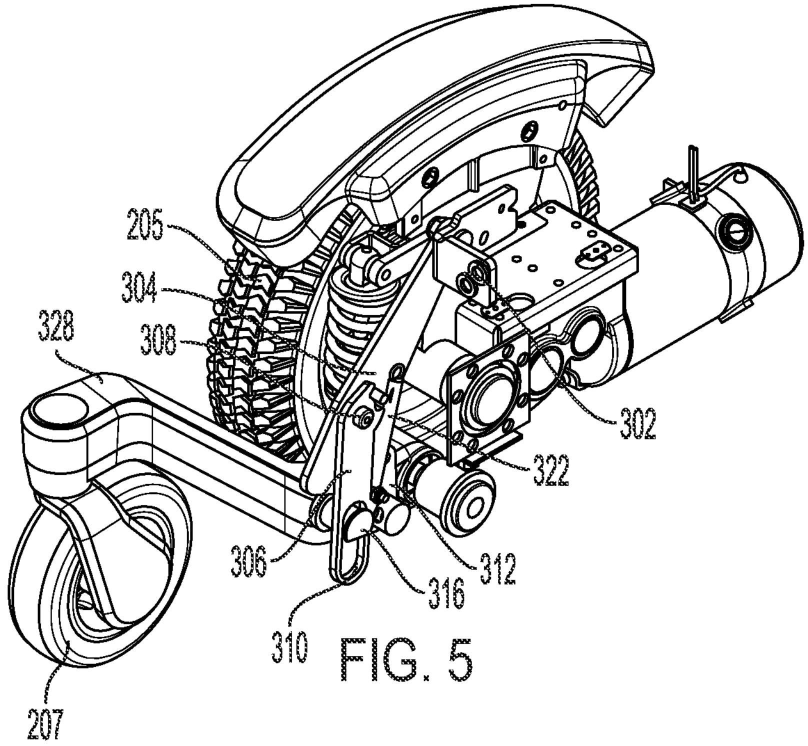
FIGS. 5 and 6 are perspective views of the components of FIG. 3.
Figure 6:
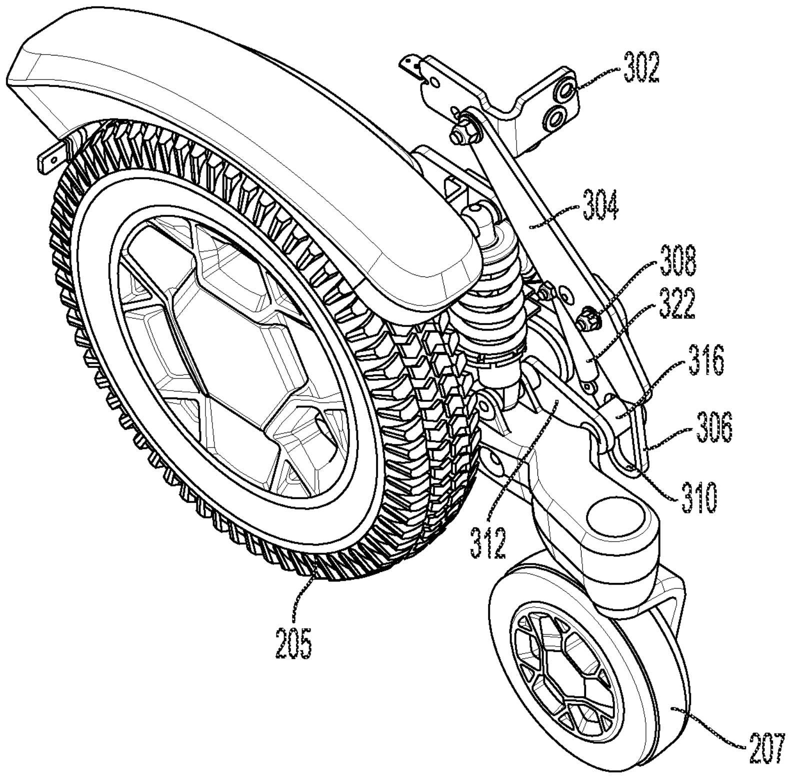

FIG. 2 shows perspective view of one embodiment of a power wheelchair base or frame 201 and a suspension system 200 of the present invention. Suspension system 200 includes left and right articulating suspension assemblies 202 and 204 that articulate over obstacles and terrain. Assemblies 202 and 204 are mirror images of each other and, hence, only one will be described in detail. In the illustrated embodiment, the system 200 has six-wheels on the ground and, in particular, two rear caster-type wheels 203 (only one shown), two center drive wheels 205, and two front caster-type wheels 207. In other embodiments, the system 200 can include a single rear caster-type wheel and eight single front caster-type wheel and each generally located proximate a centerline of the wheelchair base frame. The wheelchair is powered by a battery, electric motors, and an electronic controller to allow the user to control the behavior of the wheelchair and other systems like the user positioning system 100 (FIG. 1).

FIG. 3-6 illustrate various partial views of the power wheelchair frame 201 and suspension system 200 shown in FIG. 2, including suspension assembly 202. Suspension assembly 202 includes suspension system components that allow the suspension system to articulate when the user positioning system is in the seated position and to limit, but not fully lock in certain embodiments, that articulation when the user positioning system is in the standing position.

In the illustrated embodiment, the suspension assembly 202 includes a link system (e.g., a bifold link system) having a first or upper link 304 and a second or lower link 306. While the suspension system 202 is described as having two links, it should be understood that the suspension system 202 may have more than two links, or may have a single link. The upper link 304 is pivotally connected to the frame 201 (FIG. 2) at pivot connection point 309. In some embodiments, a bracket 302 is connected to the frame 201, and the pivot connection point 309 is disposed on the bracket 302 such that the upper link 304 is pivotally connected to the bracket 302. In other embodiments, the upper link 304 is directly connected to the frame 201. The lower link 306 is slidably connected to the front caster arm 328 such that the lower link 306 can slide relative to the front caster arm 328. For example, in certain embodiments, a plate 312 is fixedly connected to the front caster arm 328 by one or more posts (e.g., a first post 312 and a second post 314), in which the plate 312 includes a pin 316 that connects the plate 312 to a slot 310 of the lower link 306 such that the pin 316 can move within the slot 310 (see FIGS. 12-20). Slot 310 can be a slot, cutout, aperture, opening, etc., and its length and geometry can be dimensioned as needed based on design requirements. In the illustrated embodiment, the post 314 is mounted to the main body of front caster arm 328 and the post 318 is mounted to a spring mount extension member of the front caster arm 328. As such, plate 312 is rigidly mounted to front caster arm 328 and moves in unison therewith as the arm 328 pivots about its pivot joint 330 to the wheelchair base frame 201. While the pin 316 is described as being connected to the plate 312, it should be understood that the pin 316 can be connected to any component that is fixed to the front caster arm 328. In other embodiments, the pin 316 can be integral to the front caster arm 328.

Figure 12:
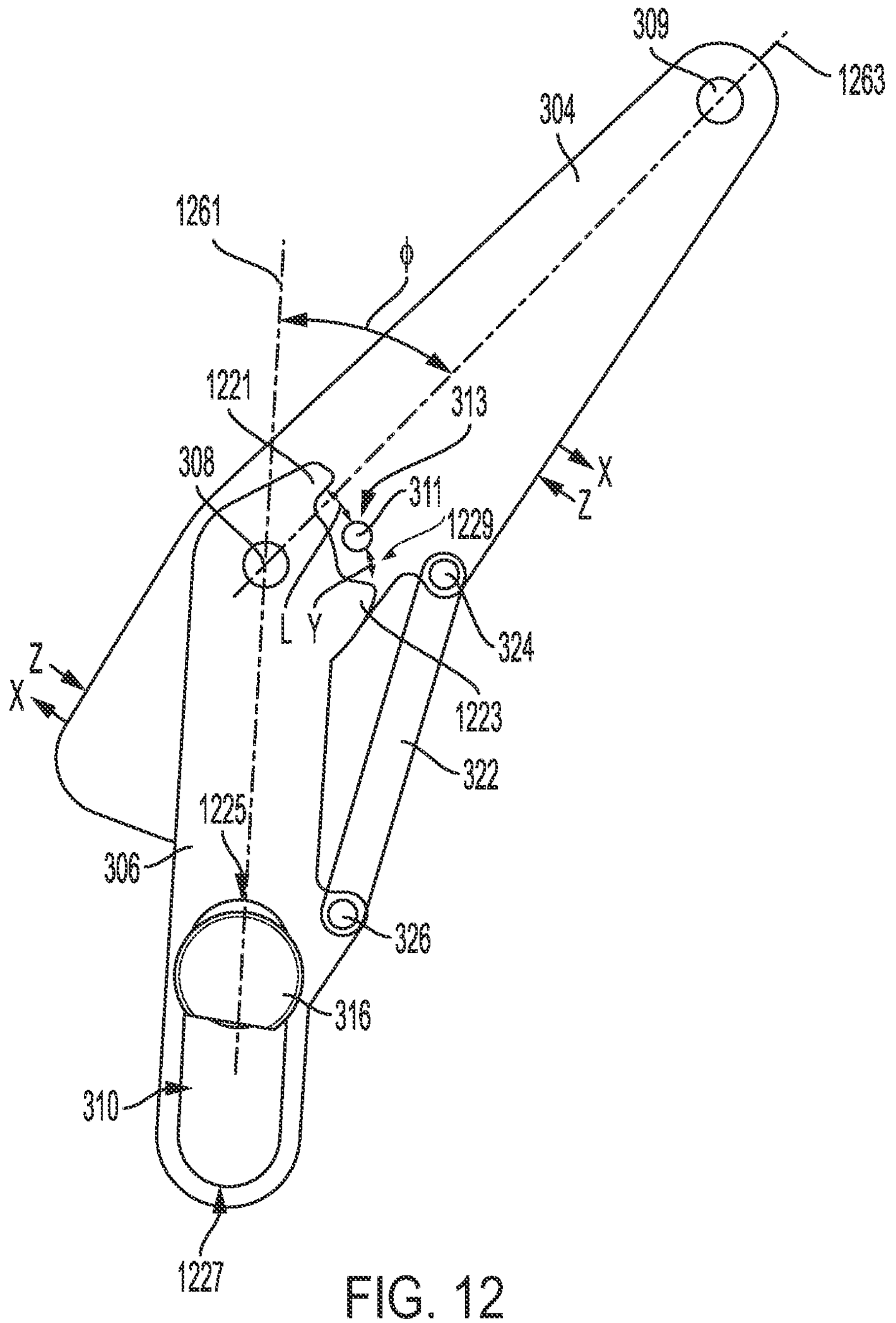
FIG. 12 is a partial elevational view of the suspension system of FIG. 2.
Figure 16:
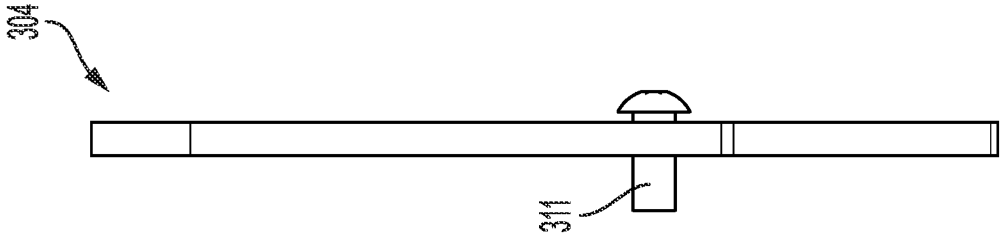
FIGS. 13-16 are elevational views of an exemplary embodiment of a first link of the suspension system shown in FIG. 12.
Figure 15:
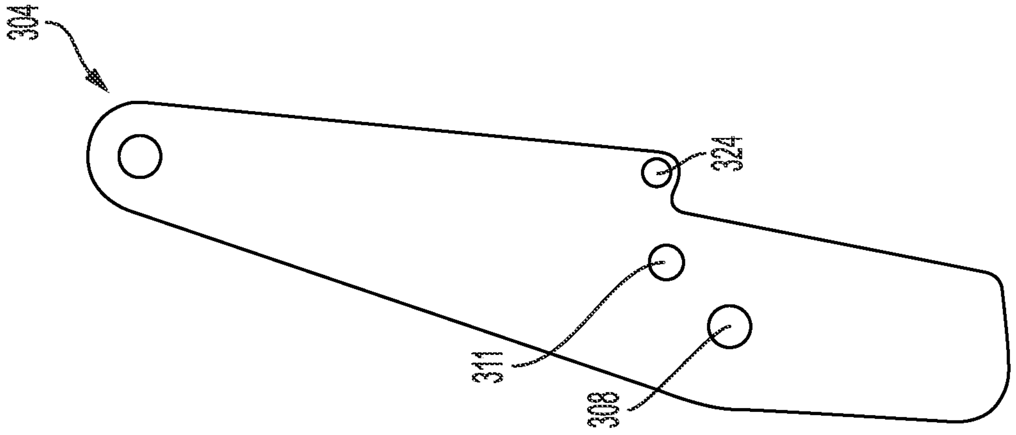
Figure 14:
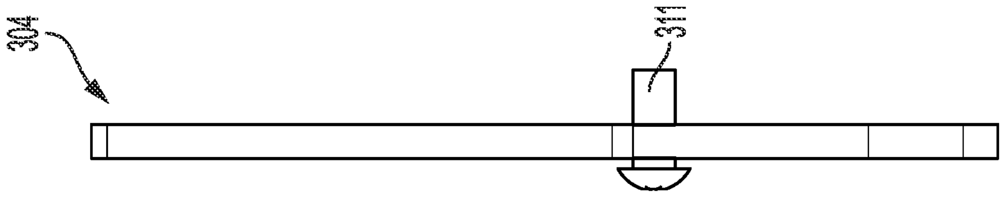
Figure 13:
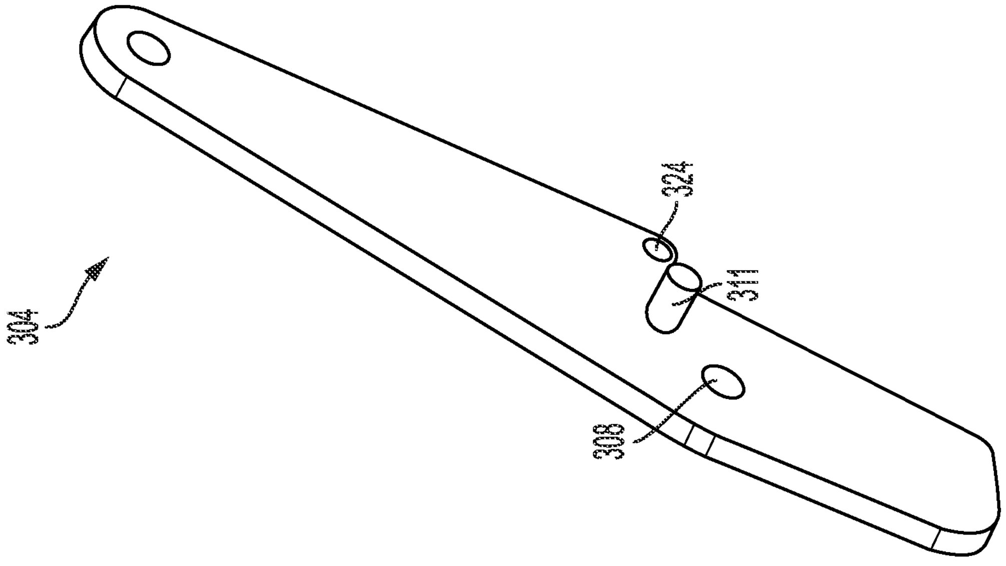
Figure 20:
FIGS. 17-20 are elevational views of an exemplary embodiment of a second link of the suspension system shown in FIG. 12.
Figure 19:
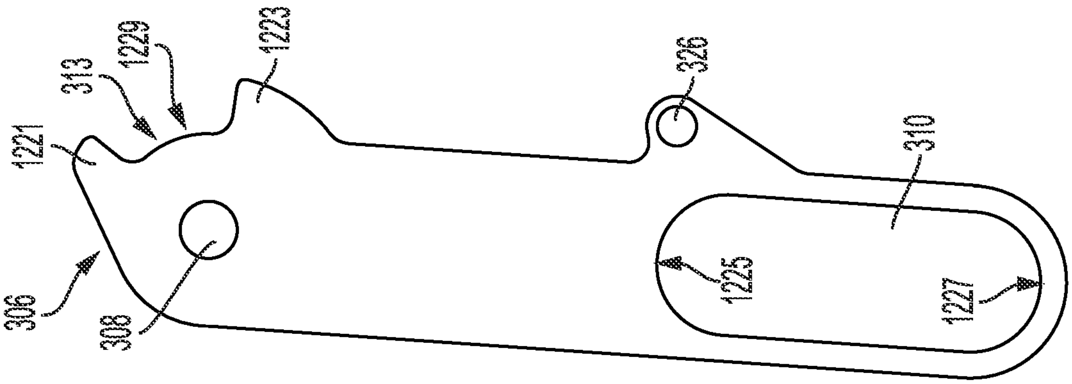
Figure 18:
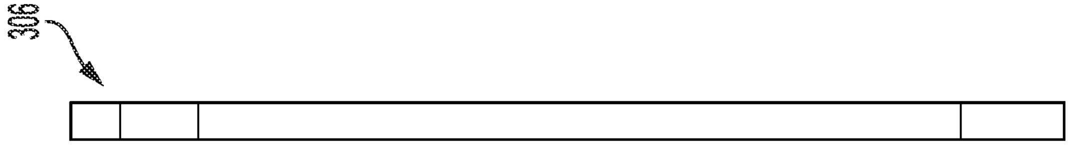
Figure 17:
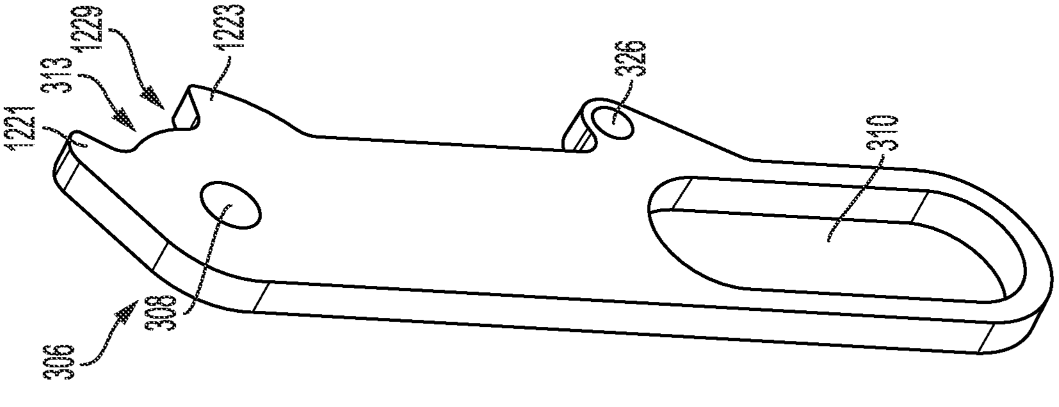

Referring to FIGS. 3-6 and 12-20, the upper link 304 is pivotally connected to lower link 306 at a pivot connection point 308 such that the upper and lower links 304, 306 can pivot with respect to each other. In some embodiments, a pin and slot arrangement is formed between the upper and lower links 304, 306 to limit the range of pivotal movement therebetween and prevent the links 304, 306 from buckling due to folding by link 304 moving in the direction X (see FIG. 12), or moving beyond a straightened position by link 304 moving in a direction Z (see FIG. 12). For example, in the illustrated embodiment, the upper link 304 includes a pin 311, and the lower link 306 includes an arcuate slot 313 in which the pin 311 moves. Referring to FIG. 12, the slot 313 may include a first extended portion 1221 and a second extended portion 1223 that define a movement area 1229. As the links 304, 306 pivot about each other about pivot connection point 308, the pin 311 of the upper link 304 moves within the movement area 1229 and extended portions 1221, 1223 engage the pin 311 to prevent the pin 311 from moving beyond a predetermined amount in either direction. The extended portion 1223 of the slot 313 sets a limit on the folding movement of the upper link 304 in the direction X relative to the lower link 306, and the extended portion 1221 of the slot 313 sets a limit on the straightening movement of the upper link 304 in the direction Z relative to the lower link 306. In alternative embodiments, the upper link 304 may have a slot, and the lower link 306 may have a pin that moves within the slot of the upper link.

Referring to FIG. 12, in certain embodiments, the positioning of the connection points 308, 309, the pin 316, and the pin 311 and slot 313 arrangement set a limit on an angle φ that the links 304, 306 can pivot relative to each other. That is, the angle φ between an axis 1261 that extends through the pin 316 and the connection point 308 and an axis 1263 that extends through the connection point 308 and the connection point 309 is limited by the engagement between the pin 311 and the extended portions 1221, 1223 of the slot 313. In certain embodiments, the angle φ can be between about 0 degrees and about 90 degrees, such as between about 0 degrees and about 80 degrees, such as between about 0 degrees and about 75 degrees, such as between about 0 degrees and about 60 degrees. In some embodiments, the angle φ can be between about 0 degrees and about 90 degrees, such as between about 5 degrees and about 90 degrees, such as between about 10 degrees and about 90 degrees, such as between about 15 degrees and about 90 degrees. In certain embodiments, the angle φ can be between about 0 degrees and about 90 degrees, such as between about 5 degrees and about 80 degrees, such as between about 10 degrees and about 75 degrees, such as between about 15 degrees and about 60 degrees, such as between about 17 degrees and about 52 degrees.

Referring to FIGS. 3-6 and 12-20, in some embodiments, the upper link 304 is also connected to the lower link 306 by a biasing member 322, which is configured to bias the upper link 304 in the folding direction X relative to the lower link 306. In the illustrated embodiment, the biasing member 322 is attached to the upper link 304 at the connection point 324 and to the lower link 306 at connection point 326. The biasing member 322 can take any suitable form that is capable of biasing the upper link 304 in the folding direction X, such as, for example, a spring, a remote spring with a cable, a gas cylinder, or any other suitable type of biasing member. In some embodiments, rather than having the pin and slot arrangement described above, the biasing member 322 may be a locking cylinder that is configured to lock and prevent the links 304, 306 from moving beyond a desired range for the angle φ (FIG. 12) such that the links 304, 306 are prevented from buckling due to folding in a direction X, or moving beyond a straightened position in a direction Z.

Figure 7:
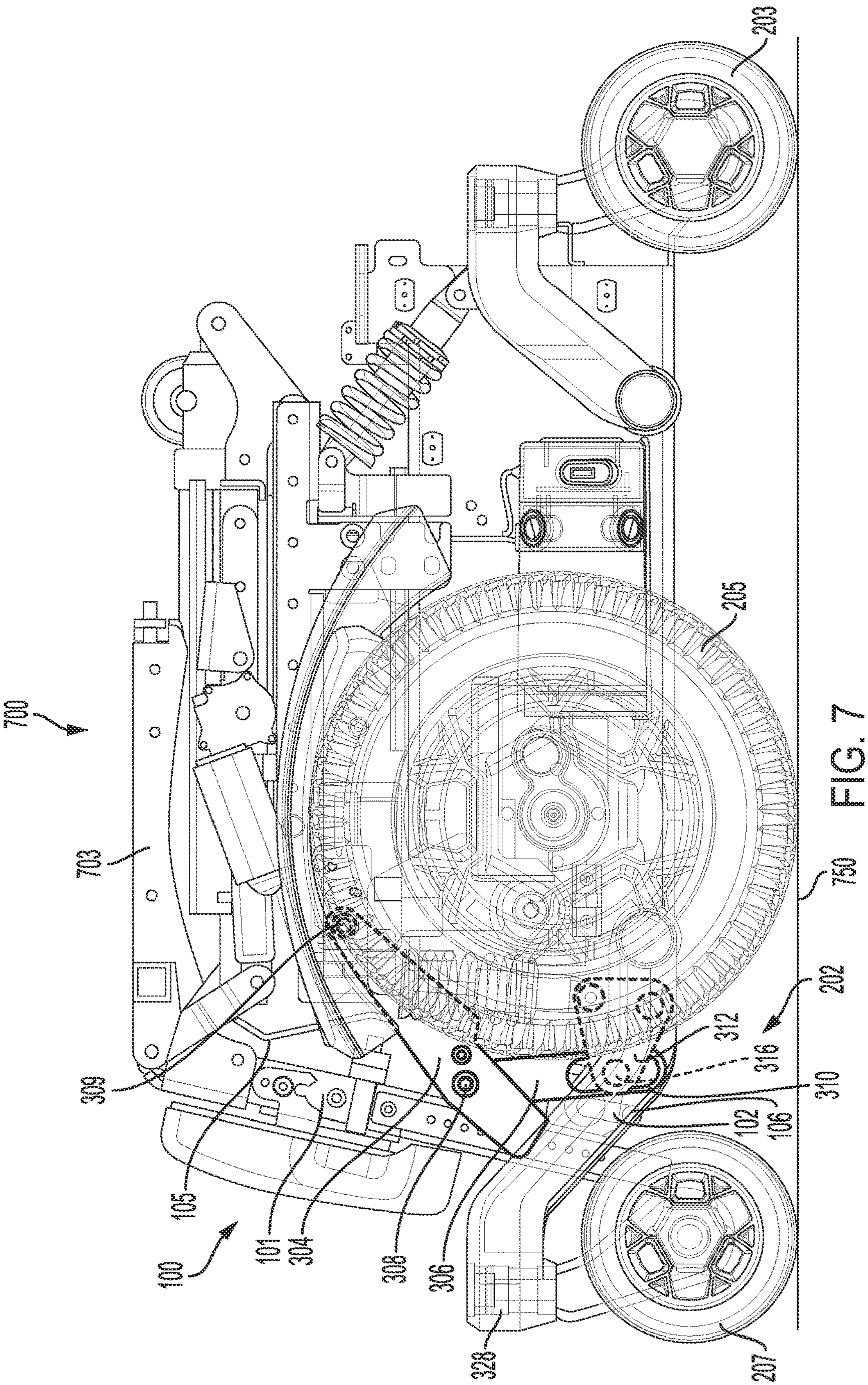
FIG. 7-9 are partial elevational side views of one embodiment of the present invention showing the suspension system behavior while the user positioning system is in the seated position.
Figure 8:
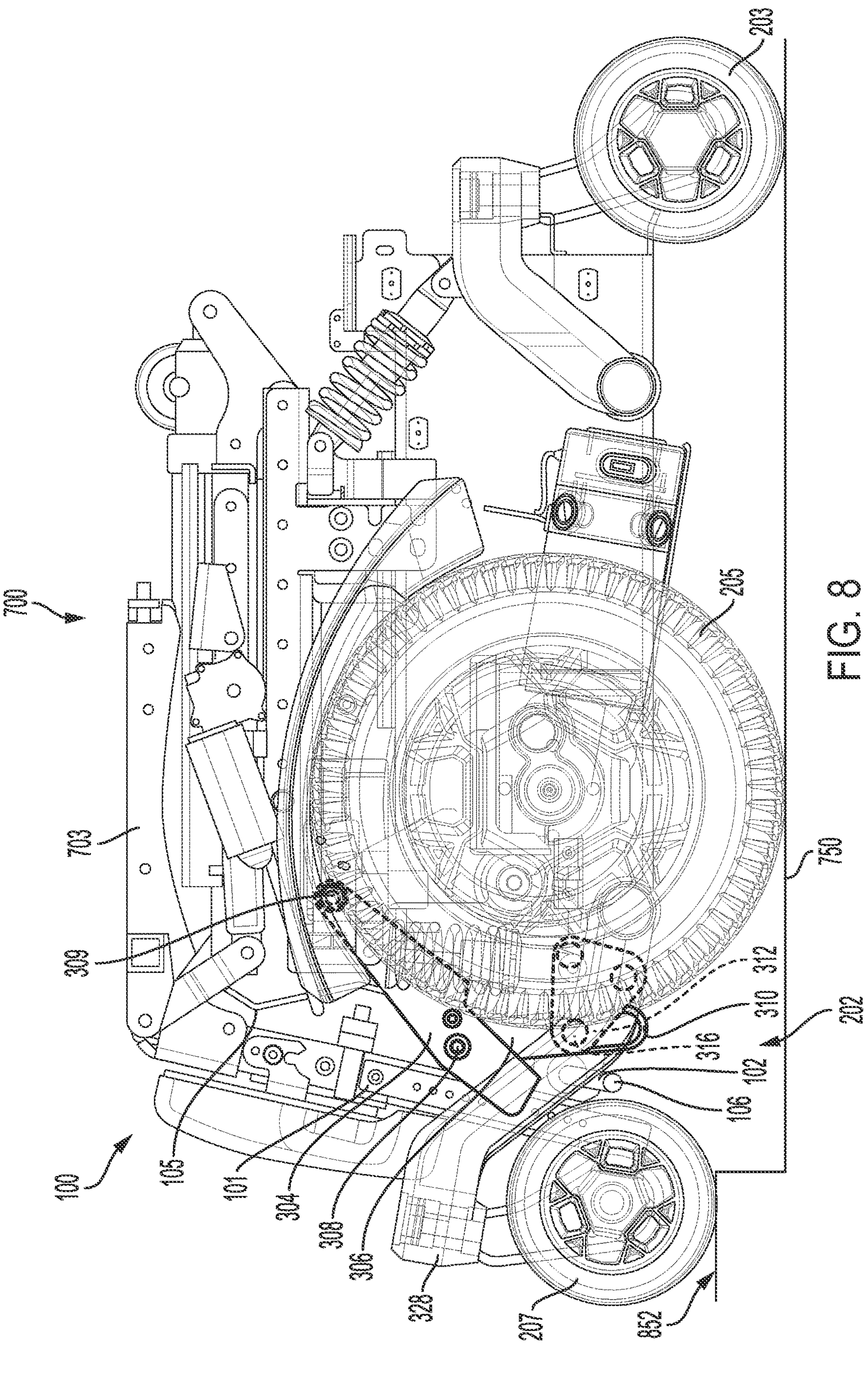
Figure 9:
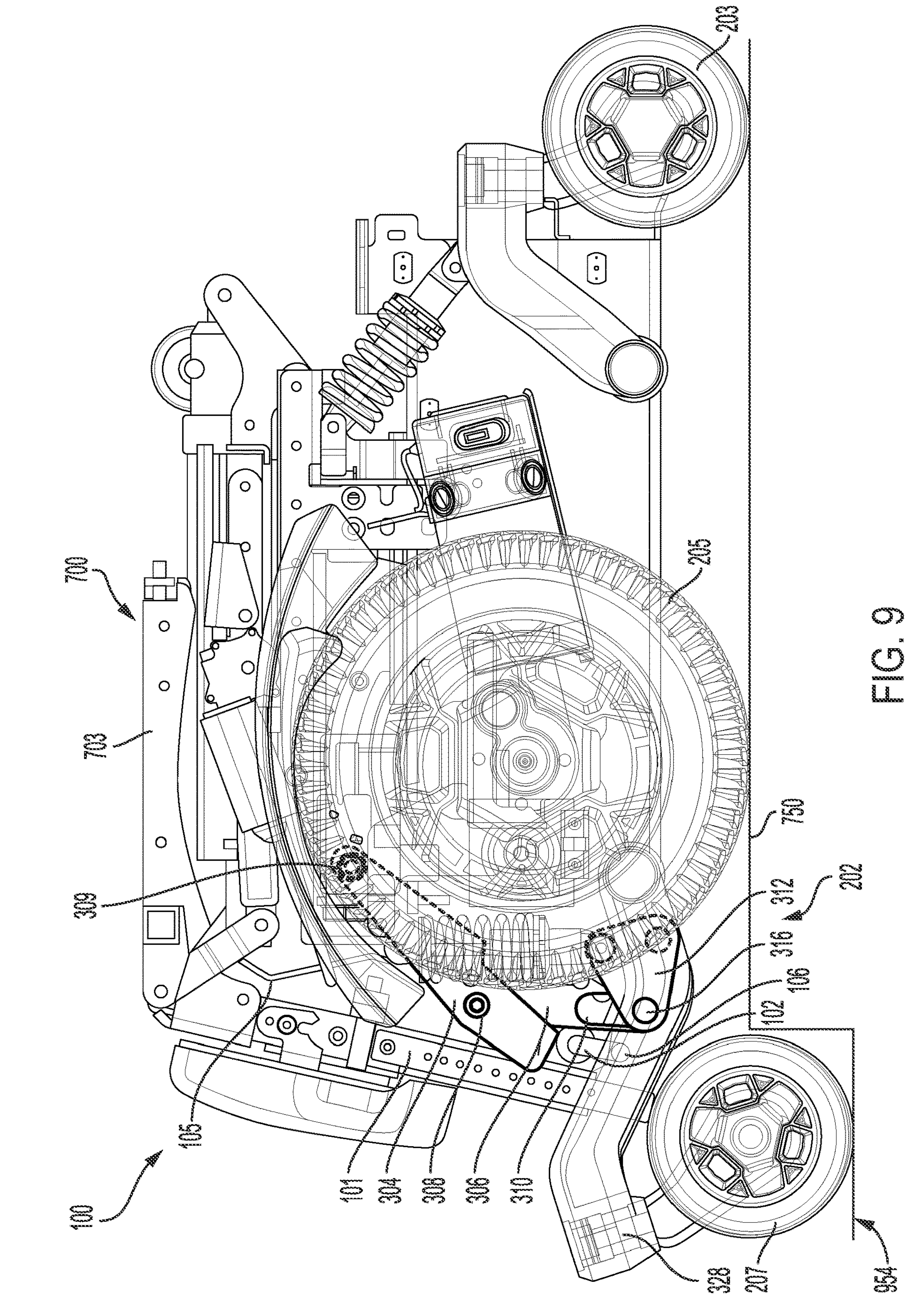

FIGS. 7-9 illustrate the suspension system 202 behavior while the user positioning system 100 (including the upper frame member 703 of the seating frame 700) is in the seated position. FIG. 7 shows the overall system on level ground surface 750. While the user positioning system 100 is in the seated position, the suspension system 202 and front caster arm 328 can move up and down to allow the front caster 207 to move over various terrain or obstacles. This freedom of movement is provided by the arrangement of pin 316 of the plate 312 and the slot 310 of the lower link 306. In the illustrated embodiment, when the wheelchair is on level ground, the pin 316 is positioned between an upper end 1225 (FIG. 12) and a lower end 1227 (FIG. 12) of the slot 310 such that there is an area for movement within the slot 310 toward both the upper end 1225 and the lower end 1227. This allows for the front caster 207 to move up or down as needed when traveling over terrain or other obstacles.

Referring to FIGS. 8-9 and discussed in more detail below, when the user positioning system 100 is in its seated position, the suspension assembly 202, including front caster arm 328, is able to move up and down in order to traverse terrain and obstacles as necessary (e.g., move up over raised surface 852 shown on FIG. 8 or moved down to lowered surface 954 shown on FIG. 9). Referring to FIG. 12, the pin 311 and slot 313 arrangement of the links 304, 306 provide a limit to this upward and downward movement of the front caster arm 328. In other embodiments, the pin 311 and slot 313 arrangement can be eliminated.

Referring to FIG. 8, when front caster arm 328 moves upward due to terrain or obstacles (e.g., raised surface 852), the pin 316 can move in the slot 310 until it engages the upper end 1225 (FIG. 12) of the slot 310. The links 304, 306 remain in a normal, non-pivoted position until the pin 316 engages an upper end 1225 of the slot 310. This engagement between the pin 316 and the upper end 1225 of the slot 310 may cause the upper and lower links 304, 306 to pivot about pivot connection point 308, and may also cause the upper link 304 to pivot about pivot connection point 309, as necessary.

Referring to FIGS. 8 and 12-20, the pin 311 and slot 313 arrangement of the links 304, 306 provide a limit to the amount of movement that the front caster arm 328 can move in the upward direction. That is, the front caster arm 328 will move upward until the pin 311 of the upper link 304 engages the extended portion 1223 of the slot 313 of the lower link 306. This engagement between the pin 311 and the extend portion 1223 prevents further upward movement of the front caster arm 328, and also prevents the links 304, 306 from buckling due to folding. Referring to FIG. 12, the pin 311 is maintained in a normal position within the movement area 1229 of the slot 313 until the pin 316 engages the upper end 1225 of the slot 310. A distance Y is between the pin 311 and the extended portion 1223 when the pin is in the normal position. The engagement between the pin 316 and the upper end 1225 of the slot 310 causes a force on the links 304, 306, which causes the links to pivot relative to each other and the pin 311 to move within the movement area 1229 of the slot until the pin 311 engages the extended portion 1223 of the slot 313.

Referring to FIG. 9, when front caster arm 328 moves downward due to terrain or obstacles (e.g., lowered surface 954), the pin 316 can move in the slot 310 until it engages the lower end 1227 (FIG. 12) of the slot 310. The links 304, 306 remain in a normal, non-pivoted position until the pin 316 engages the lower end 1227 of the slot 310. This engagement between the pin 316 and the lower end 1227 of the slot 310 may cause the upper and lower links 304, 306 to pivot about pivot connection point 308, and may also cause the upper link 304 to pivot about pivot connection point 309, as necessary.

Referring to FIGS. 9 and 12-20, the pin 311 and slot 313 arrangement of the links 304, 306 provide a limit to the amount of movement that the front caster arm 328 can move in the downward direction. That is, the front caster arm 328 will move downward until the pin 311 of the upper link 304 engages the extended portion 1221 of the slot 313 of the lower link 306. This engagement between the pin 311 and the extend portion 1221 prevents further downward movement of the front caster arm 328, and also prevents the links 304, 306 from moving beyond a straight position in the direction Z (FIG. 12). Referring to FIG. 12, the pin 311 is maintained in a normal position within the movement area 1229 of the slot 313 until the pin 316 engages the lower end 1227 of the slot 310. A distance L is between the pin 311 and the extended portion 1221 when the pin is in the normal position. The distance L may or may not be equal to the distance Y. The engagement between the pin 316 and the lower end 1227 of the slot 310 causes a force on the links 304, 306, which causes the links to pivot relative to each other and the pin 311 to move within the movement area 1229 of the slot until the pin 311 engages the extended portions 1221 of the slot 313.

Figure 10:
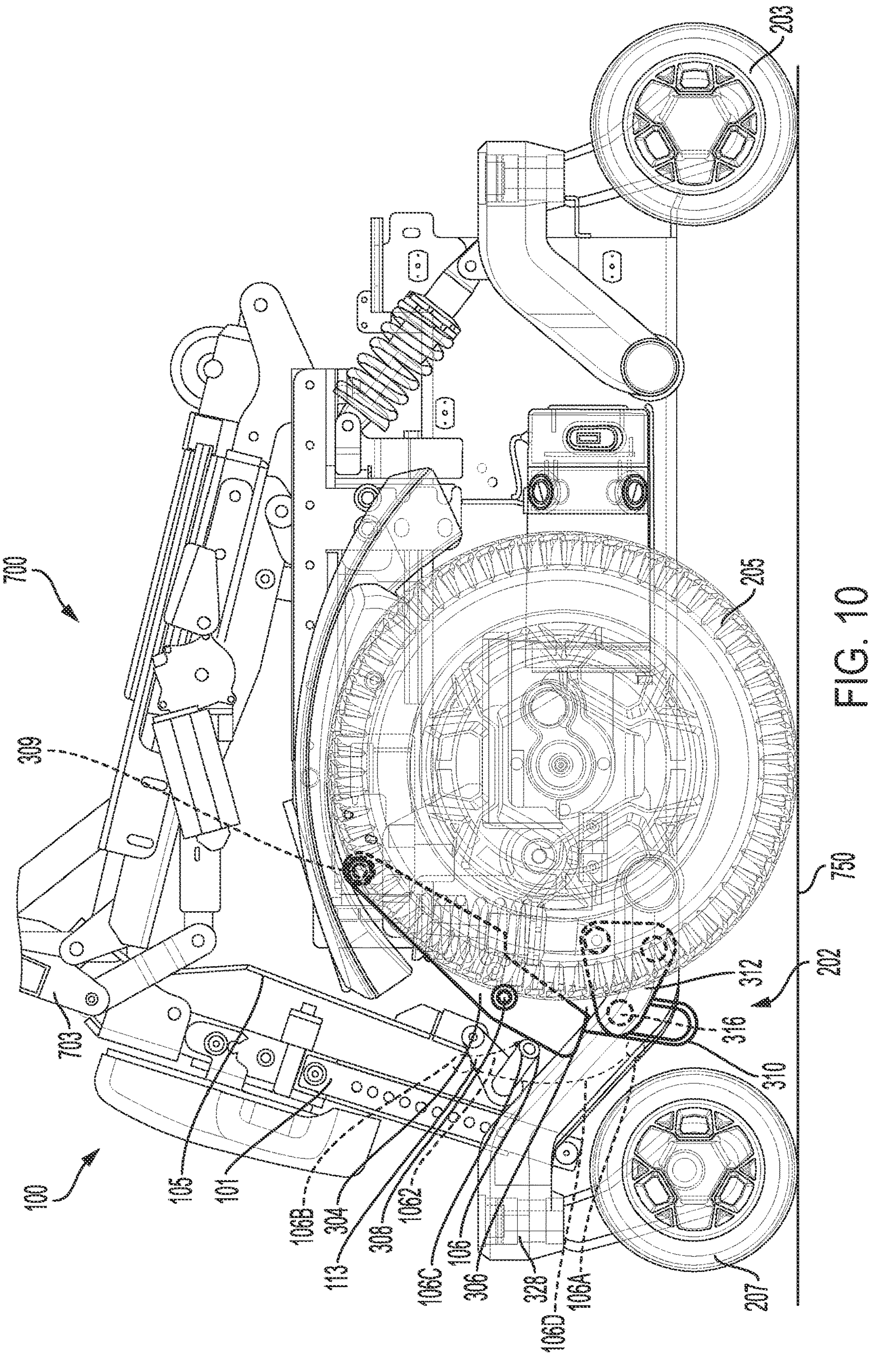
FIGS. 10-11 are partial elevational side views of the embodiment of FIGS. 7-9 showing the suspension system behavior while the user positioning system is in the standing position.
Figure 11:
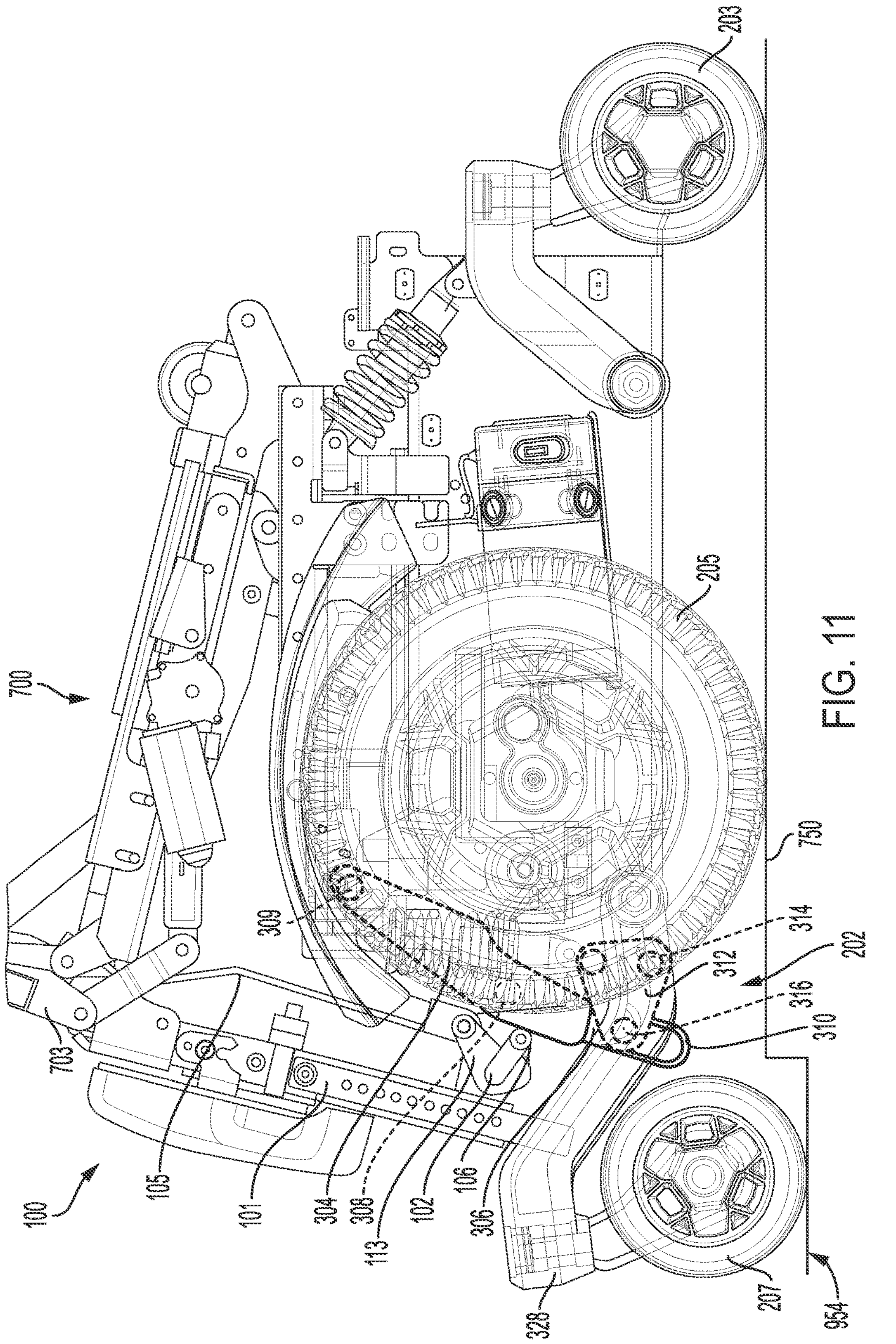

FIGS. 10-11 illustrate the suspension system behavior while the user positioning system 100 (including the upper frame member 703 of the seating frame 700) is in, for example, the standing position. FIG. 10 shows the overall system on a level ground surface 750. While the user positioning system 100 is in the standing position, the suspension assembly 202 and front caster arm 328 are limited to prevent the wheelchair from tipping. This limitation on the front caster arm 328 is facilitated by movement of bar 102 to a position where it engages and bears against link 304, as well as the movement of the pin 311 and slot arrangement 313 of the links 304, 306 (shown in FIG. 12). As shown by the dashed lines 1060, 1062, when the user positioning system 100 is moved from the seated to the standing position, the bar 102 moves from a position 106A that does not engage the suspension at all and to a position 106C where it bears against link 304 (e.g., compare the position of bar 102 in FIG. 7 to that in FIG. 10). In this embodiment, the movement of bar 102 is automated by the user positioning system 100 and its actuators and linkages. That is, the bar 102 is connected to the user positioning system 100 by link 105, and movement of the user positioning system 100 to the standing position causes the link 105 to move the bar 102 such that a portion 106 of the bar 102 engages the upper link 304 (as shown in position 106C). Referring to FIG. 10, in the illustrated embodiment, the link 105 causes the bar 102 to move in a clockwise direction 1060 from position 106A to its highest point at position 106B, and then move in a counterclockwise direction 1062 to the position 106C in which the bar 102 engages the upper link 304. This movement direction of the bar 102 is not critical and prevents the bar 102 from engaging one or more components of the wheelchair as it moves to the engagement position 106C with the upper link 304. The bar 102 may, however, be moved along various paths prior to engaging the upper link 304.

Still referring to FIG. 10, the bar 102 transfers a portion of the weight of the user to the suspension assembly 202. This can result in about 25%, for example, of the overall weight of the wheelchair and occupant being moved to the front casters. For example, when the bar 102 engages and bears against the upper link 304, the links 304, 306 will pivot (or begin to straighten) until the pin 316 bears against the upper end 1225 (FIG. 12) of slot 310. The weight or force that bar 102 brings against link 304 is transferred by the link 306 and its slot 310 to the pin 316 that is connected to the front caster arm 328 by plate 312. By this arrangement, the increased weight or force (e.g., the additional 25%) bearing down on front caster arm 328 (due to bar 102) limits the movement of the front caster arm 328 in the upward direction, and the ground prevents the front caster arm 328 from moving in the downward direction. The front caster arm 328 can be moved in the upward direction if a force stronger than the force applied by the bar 102 (and caused by a portion of the user's weight) is applied to the suspension system that allows the links 304, 306 to move in a folding direction and cause the bar 102 to move upward. Such a force can be applied to the suspension assembly 202 if a user attempts to travel over various terrain or obstacles that are relatively small, such as, for example, door thresholds and the like.

Referring to FIGS. 10 and 12-20, the pin 311 and slot 313 arrangement of the links 304, 306 provide a limit to the amount of movement that the front caster arm 328 can move in the upward direction, which prevents the wheelchair from tipping when the user positioning system 100 is in the standing position and the wheelchair is moving over various terrain or obstacles that causes the front caster arm 328 to move upward. That is, the front caster arm 328 will move upward until the pin 311 of the upper link 304 engages the extended portion 1223 of the slot 313 of the lower link 306. This engagement between the pin 311 and the extended portion 1223 prevents further upward movement of the front caster arm 328, which prevents the wheelchair from tipping when the user positioning system 100 is in the standing position.

FIG. 11 illustrates the overall system when the front caster arm 328 descends an obstacle or is past the upper threshold of a decline, door threshold, or curb (or other similar terrain topography), such as, for example, moving from surface 750 to lowered surface 954 shown in FIG. 11. In essence, the front caster arm 328 has moved to a lowered position. In this scenario, the suspension assembly 202 and front caster arm 328 may also (or be further) locked or limited by the action of bar 102 and the pin 311 and slot 313 arrangement of the links 304, 306 from a large degree of movement. As described in FIG. 10, the ground limits the downward movement of front caster arm 328 when bar 102 bears against link 304. In FIG. 11, the bar 102 still bears against link 304, but the front caster wheel surface elevation (or decline) is lower than that shown in FIG. 10. This will cause links 304, 306 to further pivot at connection point 308 (and connection point 309, if necessary) to allow the front caster arm 328 to move downward to engage the lower ground surface. Comparing links 304, 306 in FIGS. 10 and 11, it can be seen that links 304, 306 almost form a straight line in FIG. 11 (thereby giving extension to front caster arm 328).

Referring to FIGS. 11-20, the pin 311 and slot 313 arrangement of the links 304, 306 provide a limit to the amount of movement that the front caster arm 328 can move in the downward direction, which prevents the wheelchair from tipping when the user positioning system 100 is in the standing position and the wheelchair is moving over various terrain or obstacles that causes the front caster arm 328 to move downward. That is, the front caster arm 328 will move downward until the pin 311 of the upper link 304 engages the extended portion 1221 of the slot 313 of the lower link 306. This engagement between the pin 311 and the extend portion 1221 prevents further downward movement of the front caster arm 328, which prevents the wheelchair from tipping when the user positioning system 100 is in the standing position.

The suspension systems 200 described herein provide increased forward stability when the user positioning system is in the standing position and the weight (or center of gravity) of the wheelchair system has moved to a more forward position. In this instance, the suspension system 200 is able to take advantage of the increased forward weight distribution to restrict the movement of the front caster arms thereby stabilizing the front of the wheelchair frame from exhibiting an unsettling forward tipping behavior.

While various inventive aspects, concepts and features of the inventions may be described and illustrated herein as embodied in combination with exemplary embodiments, these various aspects, concepts and features may be used in many alternative embodiments, either individually or in various combinations and sub-combinations thereof. Unless expressly excluded herein, all such combinations and sub-combinations are intended to be within the scope of the present inventions. Still further, while various alternative embodiments as to the various aspects, concepts and features of the inventions—such as alternative materials, structures, configurations, methods, devices and components, alternatives as to form, fit and function, and so on—may be described herein, such descriptions are not intended to be a complete or exhaustive list of available alternative embodiments, whether presently known or later developed. Those skilled in the art may readily adopt one or more of the inventive aspects, concepts or features into additional embodiments and uses within the scope of the present inventions even if such embodiments are not expressly disclosed herein.

Additionally, even though some features, concepts or aspects of the inventions may be described herein as being a preferred arrangement or method, such description is not intended to suggest that such feature is required or necessary unless expressly so stated. Still further, exemplary or representative values and ranges may be included to assist in understanding the present disclosure; however, such values and ranges are not to be construed in a limiting sense and are intended to be critical values or ranges only if so expressly stated. Moreover, while various aspects, features and concepts may be expressly identified herein as being inventive or forming part of an invention, such identification is not intended to be exclusive, but rather there may be inventive aspects, concepts and features that are fully described herein without being expressly identified as such or as part of a specific invention. Descriptions of exemplary methods or processes are not limited to inclusion of all steps as being required in all cases, nor is the order that the steps are presented to be construed as required or necessary unless expressly so stated.

What is claimed:

1. A wheelchair, comprising:

a frame;

a suspension system comprising:

at least one front caster arm pivotally connected to the frame;

a front caster connected to the front caster arm;

a first link pivotally connected to the frame;

a second link pivotally connected to the first link and the front caster arm;

a first slot and a first pin comprising a first range of pivotal movement between the first and second links, wherein the first slot comprises a first extended portion at a first end of the first slot and a second extended portion at a second end of the first slot; and a second slot and a second pin comprising a second range of movement between second link and the front caster arm, wherein the second pin is configured to move between an upper end of the second slot and a lower end of the second slot, and wherein when increased force of a user of the wheelchair is applied against the first link, the movement of the front caster arm is limited in an upward direction.

2. The wheelchair of claim 1 wherein the first slot comprises an arcuate slot.

3. The wheelchair of claim 1 wherein the first slot comprises an arcuate slot and, wherein the front caster arm is configured to move upward until the first pin engages the first extended portion.

4. The wheelchair of claim 1 wherein the second link comprises the first and second slots.

5. The wheelchair of claim 1 wherein the first link comprises the first pin.

6. The wheelchair of claim 1 wherein the first link comprises the first pin and the second link comprises the first slot.

7. The wheelchair of claim 1 wherein the front caster arm comprises the second pin.

8. The wheelchair of claim 1 wherein the second link comprises the second slot.

9. The wheelchair of claim 1 wherein the front caster arm comprises the second pin and the second link comprises the second slot.

10. A wheelchair comprising:

a user support system comprising a seated position and an elevated position;

a frame supporting the user support system; and a suspension system connected to the frame and comprising:

a front caster arm having a front caster;

wherein the front caster arm comprises a first range of pivotal movement when the user support system is in a seated position and a second range of pivotal movement less than the first range of movement when the user support system is in the elevated position; and a plurality of linkages coupled to the frame and the front caster arm and wherein the plurality of linkages comprise a first slot and a first pin connection between a first linkage and the front caster arm and a second slot and second pin connection between a second linkage and the first linkage, wherein the first pin is configured to move between an upper end of the first slot and a lower end of the first slot, and wherein user weight applied against the second linkage forces the first and second linkages into contact with the first pin biasing it in a downward direction and impeding upward movement of the first pin.

11. The wheelchair of claim 10 wherein the first range of movement comprises a movement area within the first slot.

12. The wheelchair of claim 11 wherein the second range of movement comprises a movement area within the second slot.

13. The wheelchair of claim 10 wherein the first range of movement comprises a first movement area within the first slot and the second range of movement comprises a second movement area within the second slot.

14. A wheelchair comprising:

a user support system comprising a seated position and an elevated position;

a frame means;

a suspension means comprising:

a means for supporting at least one front caster on the frame means;

a means for allowing the front caster to move a first range of movement when the user support system is in the seated position wherein the means for allowing the front caster to move the first range of movement comprises a first slot having an extended portion and a first pin;

a means for allowing the front caster to move a second range of movement when the user support system is in the elevated position and wherein the second range of movement is less than the first range of movement, wherein the means for allowing the front caster to move the second range of movement comprises a second slot having an upper end and a lower end and a second pin configured to move between the upper end and the lower end, and a means for transferring a portion of the user's weight to the means for supporting the at least one front caster when the user support system is in the elevated position, wherein when the portion of the user's weight is transferred to the means for supporting the at least one front caster, the movement of the means for supporting at least one front caster on the frame means is limited in an upward direction.

15. The wheelchair of claim 14 wherein the means for supporting the at least one front caster is configured to move upward until the first pin engages the extended portion.

* * * * *